US010350754B2

(12) United States Patent
Nagamatsu

(10) Patent No.: US 10,350,754 B2
(45) Date of Patent: Jul. 16, 2019

(54) CONTROL DEVICE FOR ROBOT

(71) Applicant: DENSO WAVE INCORPORATED, Chita-gun, Aichi-pref. (JP)

(72) Inventor: Kenji Nagamatsu, Chita-gun (JP)

(73) Assignee: DENSO WAVE INCORPORATED, Aichi-Pref. (JP)

(*) Notice: Subject to any disclaimer, the term of this patent is extended or adjusted under 35 U.S.C. 154(b) by 93 days.

(21) Appl. No.: 15/662,724

(22) Filed: Jul. 28, 2017

(65) Prior Publication Data

US 2018/0085919 A1 Mar. 29, 2018

(30) Foreign Application Priority Data

Sep. 27, 2016 (CN) ............................. 2016-188041
Sep. 27, 2016 (CN) ............................. 2016-188042

(51) Int. Cl.
*B25J 9/16* (2006.01)
*G05B 5/01* (2006.01)

(52) U.S. Cl.
CPC ............ *B25J 9/1633* (2013.01); *B25J 9/161* (2013.01); *B25J 9/1641* (2013.01); *B25J 9/1679* (2013.01); *B25J 9/1694* (2013.01); *G05B 5/01* (2013.01); *G05B 2219/39241* (2013.01); *G05B 2219/40582* (2013.01); *G05B 2219/40597* (2013.01)

(58) Field of Classification Search
CPC ...... B25J 9/1633; B25J 9/1641; B25J 9/1679; B25J 9/161; B25J 9/1694; G05B 5/01; G05B 2219/40597; G05B 2219/40582; G05B 2219/39241

USPC .................................................. 700/245, 260
See application file for complete search history.

(56) References Cited

U.S. PATENT DOCUMENTS

| 5,213,176 | A | * | 5/1993 | Oroku | ................... | B60B 19/003 |
| | | | | | | 180/168 |
| 5,265,195 | A | * | 11/1993 | Jinno | ..................... | B24B 27/04 |
| | | | | | | 318/576 |
| 5,287,031 | A | * | 2/1994 | Akiba | ..................... | F16C 29/00 |
| | | | | | | 310/12.19 |
| 7,473,841 | B2 | * | 1/2009 | Fujiwara | .................. | G10F 1/02 |
| | | | | | | 84/20 |
| 9,020,638 | B2 | * | 4/2015 | Iida | ........................ | B25J 9/1638 |
| | | | | | | 318/568.1 |

(Continued)

FOREIGN PATENT DOCUMENTS

JP H10-100085 A 4/1998

*Primary Examiner* — Jaime Figueroa
(74) *Attorney, Agent, or Firm* — Oliff PLC

(57) ABSTRACT

A control device controlling a robot including a driving unit, a moving unit that is slidable along a predetermined track and a predetermined shaft that is slidably supported by the moving unit includes an instruction value calculating unit calculating an instruction value that drives the driving unit such that the moving unit is moved to a target position, an accelerating-speed calculating unit calculating an angular accelerating speed of when the instruction value changes, a gravity-center distance calculating unit calculating a gravity center distance, a correction instruction-value calculating unit calculating a correction instruction value by correcting the instruction value such that a position of the gravity center which is projected on the predetermined track approaches the target position, and a driving control unit controlling the driving unit based on the correction instruction value.

21 Claims, 8 Drawing Sheets

(56) References Cited

U.S. PATENT DOCUMENTS

| | | | |
|---|---|---|---|
| 9,095,979 B2* | 8/2015 | Motoyoshi | B25J 9/1694 |
| 9,280,149 B2* | 3/2016 | Sugihara | G05B 19/19 |
| 9,298,179 B2* | 3/2016 | Toshimitsu | G05B 19/19 |
| 9,748,880 B2* | 8/2017 | Mizuo | H02P 8/04 |
| 2006/0071625 A1* | 4/2006 | Nakata | B25J 9/1633 318/568.12 |
| 2006/0185503 A1* | 8/2006 | Fujiwara | G10F 1/02 84/626 |
| 2009/0058346 A1* | 3/2009 | Marushita | G05D 19/02 318/611 |
| 2009/0224444 A1* | 9/2009 | Mayama | F16F 15/0275 267/118 |
| 2010/0318223 A1* | 12/2010 | Motoyoshi | B25J 9/1638 700/253 |
| 2011/0004343 A1* | 1/2011 | Iida | B25J 9/1638 700/253 |
| 2012/0035763 A1* | 2/2012 | Motoyoshi | B25J 9/1694 700/258 |
| 2012/0229069 A1* | 9/2012 | Ohta | H02P 3/00 318/601 |
| 2012/0296471 A1* | 11/2012 | Inaba | B25J 9/163 700/253 |
| 2014/0009100 A1* | 1/2014 | Sera | G05B 5/01 318/611 |
| 2014/0039678 A1* | 2/2014 | Motoyoshi | B25J 9/1694 700/258 |
| 2014/0060233 A1* | 3/2014 | Gomi | B25J 9/1638 74/490.05 |
| 2014/0067125 A1* | 3/2014 | Niu | B25J 9/1638 700/258 |
| 2014/0217951 A1* | 8/2014 | Sugihara | G05B 19/19 318/600 |
| 2015/0015173 A1* | 1/2015 | Ide | G05B 13/04 318/561 |
| 2016/0318183 A1* | 11/2016 | Motoyoshi | B25J 9/1641 |
| 2017/0151664 A1* | 6/2017 | Makino | B25J 5/02 |
| 2018/0028839 A1* | 2/2018 | Yoshimizu | A61N 5/1083 |
| 2018/0164772 A1* | 6/2018 | Fan | G05B 19/19 |

* cited by examiner

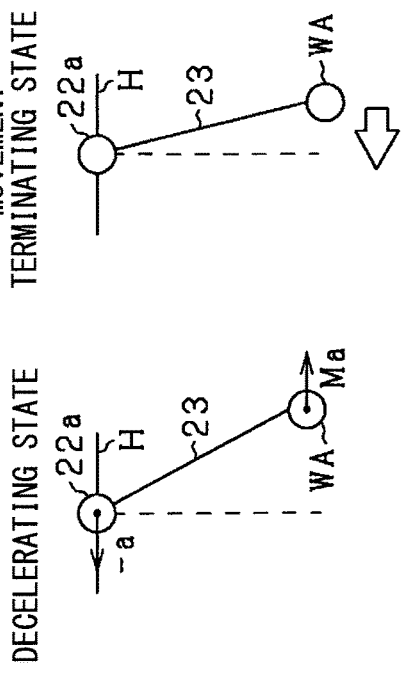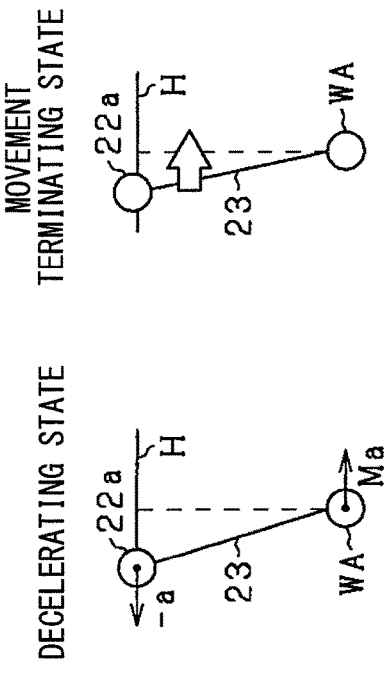

CONTROL DEVICE FOR ROBOT

CROSS REFERENCE TO RELATED APPLICATION

This application is based on Japanese Patent Application No. 2016-188041 filed on Sep. 27, 2016 and Japanese Patent Application No. 2016-188042 filed on Sep. 27, 2016, the disclosures of which are incorporated herein by reference.

TECHNICAL FIELD

The present disclosure relates to a control device which controls an operation of a robot.

BACKGROUND

According to JPH10-100085A, an instruction value controlling a driving unit of each joint to suppress a vibration generated at a tip end of an arm of a robot is compensated based on an acceleration speed quantity sensed by an acceleration speed sensor assembled at a position in the vicinity of the tip end.

SUMMARY

However, in a configuration where the acceleration speed quantity is sensed by the acceleration speed sensor, it is necessary that the acceleration speed sensor is assembled at a position in the vicinity of the tip end of the arm where the vibration is actually generated. When the above configuration is actually applied to the robot, it is difficult that a space at which the acceleration speed sensor is assembled in the vicinity of the tip end of the arm is ensured and wirings of the acceleration speed sensor are laid.

It is an object of the present disclosure to provide a control device applied to a robot which can suppress a vibration of the robot and is readily actually applied to the robot.

According to a first aspect of the present disclosure, the control device is applied to the robot that includes a driving unit, a moving unit that is driven by the driving unit and is slidable along a predetermined track in a horizontal surface, and a predetermined shaft that is slidably supported by the moving unit in a vertical direction, the predetermined shaft to which a subject is assembled. The control device includes an instruction value calculating unit calculating an instruction value that drives the driving unit such that the moving unit is moved to a target position that is a latest target position of the moving unit, an accelerating-speed calculating unit calculating an accelerating speed of when the instruction value calculated by the instruction value calculating unit changes, a gravity-center distance calculating unit calculating a gravity center distance that is a distance from a support portion of the moving unit supporting the predetermined shaft to a gravity center of a total load that is equivalent to the predetermined shaft and the subject, based on the gravity center and a position of the predetermined shaft in the vertical direction, a correction instruction-value calculating unit calculating a correction instruction value by correcting the instruction value calculated by the instruction value calculating unit, based on the instruction value, a spring constant of the support portion relative to a twisting of the predetermined shaft, the mass of the total load, the accelerating speed calculated by the accelerating-speed calculating unit and the gravity center distance calculated by the gravity-center distance calculating unit, such that a position of the gravity center which is projected on the predetermined track approaches the target position, and a driving control unit controlling the driving unit based on the correction instruction value calculated by the correction-instruction valve calculating unit.

According to the above aspect, the robot includes the driving unit, the moving unit and the predetermined shaft. The moving unit is driven by the driving unit and is slidable along the predetermined track in the horizontal surface. The predetermined shaft is slidably supported by the moving unit in the vertical direction, and the subject is assembled to the predetermined shaft.

The instruction value calculating unit calculates the instruction value that drives the driving unit such that the moving unit is moved to the latest target position. The accelerating-speed calculating unit calculates the accelerating speed of when the instruction value calculated by the instruction value calculating unit changes. The accelerating speed of when the instruction value changes is correlative to an accelerating speed where the moving unit is moved to the latest target position.

When the moving unit is accelerated or decelerated, the inertial force that is as same as an inertial force of when the mass of the total load exists is applied to a position of the gravity center distance defined from the support portion of the moving unit supporting the predetermined shaft to the gravity center of the total load of the predetermined shaft and the subject. In this case, since the predetermined shaft is slidably supported in the vertical direction, the gravity center distance changes according to an operation state of the predetermined shaft, and a height of the inertial force that is applied changes. The gravity-center distance calculating unit calculates the gravity center distance based on the gravity center of the total load and the position of the predetermined shaft in the vertical direction.

The position of the gravity center of the total load which is projected on the predetermined track displaces from the target position by the inertial force according to the spring constant of the support portion relative to the twisting of the predetermined shaft. When the position of the gravity center which is projected on the predetermined track is different from the target position, a vibration is generated at the predetermined shaft in a case where the displacement is cancelled. The inertial force can be calculated based on the mass of the total load, and the accelerating speed of when the instruction value changes. Further, a quantity that the position of the gravity center which is projected on the predetermined track displaces from the target position can be calculated based on the inertial force, the gravity center distance and the spring constant.

The correction instruction-value calculating unit calculates the correction instruction value by correcting the instruction value calculated by the instruction value calculating unit, based on the instruction value, the spring constant, the mass of the total load, the accelerating speed of when the instruction value changes and the gravity center distance, such that the position of the gravity center which is projected on the predetermined track approaches the target position. In other words, the correction instruction-value calculating unit calculates the correction instruction value by correcting the instruction value so as to decrease a displacement between the position of the gravity center and the target position. The driving control unit controls the driving unit based on the correction instruction value that is calculated. Thus, when the displacement between the position of the gravity center and the target position is cancelled, it can be suppressed that the vibration is generated at the predetermined shaft. Further, since the correction instruction value can be calculated based on the instruction value, a known value that is the spring constant, the accelerating speed of the instruction value and the gravity center distance without arranging an acceleration sensor at a position where the vibration is actually generated, the control device can be readily actually applied to the robot.

According to a second aspect of the present disclosure, the control device is applied to the robot that includes a driving unit, a moving unit that is driven by the driving unit and is slidable along a predetermined track in a horizontal surface, and a predetermined shaft that is slidably supported by the moving unit in a vertical direction, the predetermined shaft to which a subject is assembled. The control device includes a target position calculating unit calculating a target position that is a latest target position of the moving unit, an accelerating-speed calculating unit calculating an accelerating speed of when the target position calculated by the target position calculating unit changes, a gravity-center distance calculating unit calculating a gravity center distance that is a distance from a support portion of the moving unit supporting the predetermined shaft to a gravity center of a total load that is equivalent to the predetermined shaft and the subject, based on the gravity center and a position of the predetermined shaft in the vertical direction, a correction target-position calculating unit calculating a correction target position that is obtained by correcting the target position, based on the target position calculated by the target position calculating unit, a spring constant relative to a twisting of the predetermined shaft, a mass of the total load, the accelerating speed calculated by the accelerating-speed calculating unit, and the gravity center distance calculated by the gravity-center distance calculating unit, such that a position of the gravity center which is projected on the predetermined track approaches the target position, a correction instruction-value calculating unit calculating a correction instruction value that drives the driving unit to control the driving unit to move to the correction target position calculated by the correction target-position calculating unit, and a driving control unit controlling the driving unit based on the correction instruction value calculated by the correction-instruction valve calculating unit.

According to the above aspect, the robot includes the driving unit, the moving unit and the predetermined shaft. The moving unit is driven by the driving unit and is slidable along the predetermined track in a horizontal surface. The predetermined shaft is slidably supported by the moving unit in a vertical direction, and a subject is assembled to the predetermined shaft.

The target position calculating unit calculates the latest target position of the moving unit. The accelerating-speed calculating unit calculates the accelerating speed of when the target position calculated by the target position calculating unit changes.

When the moving unit is accelerated or decelerated, the inertial force that is as same as an inertial force of when the mass of the total load exists is applied to a position of the gravity center distance defined from the support portion of the moving unit supporting the predetermined shaft to the gravity center of the total load of the predetermined shaft and the subject. In this case, since the predetermined shaft is slidably supported in the vertical direction, the gravity center distance changes according to an operation state of the predetermined shaft, and a height of the inertial force that is applied changes. The gravity-center distance calculating unit calculates the gravity center distance based on the gravity center of the total load and the position of the predetermined shaft in the vertical direction.

The position of the gravity center of the total load which is projected on the predetermined track displaces from the target position by the inertial force according to the spring constant of the support portion relative to the twisting of the predetermined shaft. When the position of the gravity center which is projected on the predetermined track is different from the target position, a vibration is generated at the predetermined shaft in a case where the displacement is cancelled. The inertial force can be calculated based on the mass of the total load and the accelerating speed of the target position. Further, a quantity that the position of the gravity center which is projected on the predetermined track displaces from the target position can be calculated based on the inertial force, the gravity center distance and the spring constant.

Thus, the correction target-position calculating unit calculates the correction target position by correcting the target position based on the target position, the spring constant, the mass of the total load, the accelerating speed of when the target position changes and the gravity center distance, such that the position of the gravity center which is projected on the predetermined track approaches the target position. In other words, the correction target-position calculating unit calculates the correction target position by correcting the target position so as to decrease the displacement between the position of the gravity center and the target position.

The correction instruction-value calculating unit calculates the correction instruction value driving the driving portion to move the moving unit to the correction target position calculated by the correction target-position calculating unit. The driving control unit controls the driving unit based on the correction instruction value that is calculated. Thus, when the displacement between the position of the gravity center and the target position is cancelled, it can be suppressed that the vibration is generated at the predetermined shaft. Further, the correction target position can be calculated based on the target position, a known value that is the spring constant, the accelerating speed of the target position and the gravity center distance without arranging an acceleration sensor at a position where the vibration is actually generated, and the correction instruction value can be calculated based on the correction target position. Thus, the control device can be readily actually applied to the robot.

BRIEF DESCRIPTION OF THE DRAWINGS

The above and other objects, features and advantages of the present disclosure will become more apparent from the following detailed description made with reference to the accompanying drawings. In the drawings:

FIG. 4A is a schematic diagram showing a relationships between a target position and a gravity position of when a second shaft is stopped, in a comparison example;

FIG. 4B is a schematic diagram showing the relationships between the target position and the gravity position of when the second shaft is accelerated, in the comparison example;

FIG. 4C is a schematic diagram showing the relationship between the target position and the gravity position of when the second shaft is maintained to move in a constant speed, in the comparison example;

FIG. 4D is a schematic diagram showing the relationship between the target position and the gravity position of when the second shaft is decelerated, in the comparison example;

FIG. 4E is a schematic diagram showing the relationship between the target position and the gravity position of when a movement of the second shaft is completed, in the comparison example;

FIG. 4F is a schematic diagram showing the relationships between the target position and the gravity position of when the second shaft is stopped, in a first embodiment of the present disclosure;

FIG. 4G is a schematic diagram showing the relationships between the target position and the gravity position of when the second shaft is accelerated, in the first embodiment;

FIG. 4H is a schematic diagram showing the relationship between the target position and the gravity position of when the second shaft is maintained to move in a constant speed, in the first embodiment;

FIG. 4I is a schematic diagram showing the relationship between the target position and the gravity position of when the second shaft is decelerated, in the first embodiment;

FIG. 4J is a schematic diagram showing the relationship between the target position and the gravity position of when the movement of the second shaft is completed, in the first embodiment;

DESCRIPTION OF EMBODIMENTS

Hereafter, referring to drawings, embodiments of the present disclosure will be described. The embodiments of the present disclosure are applied to an industrial robot that is used in an assembling line in a machinery assembling factory.

First Embodiment

Figure 1:
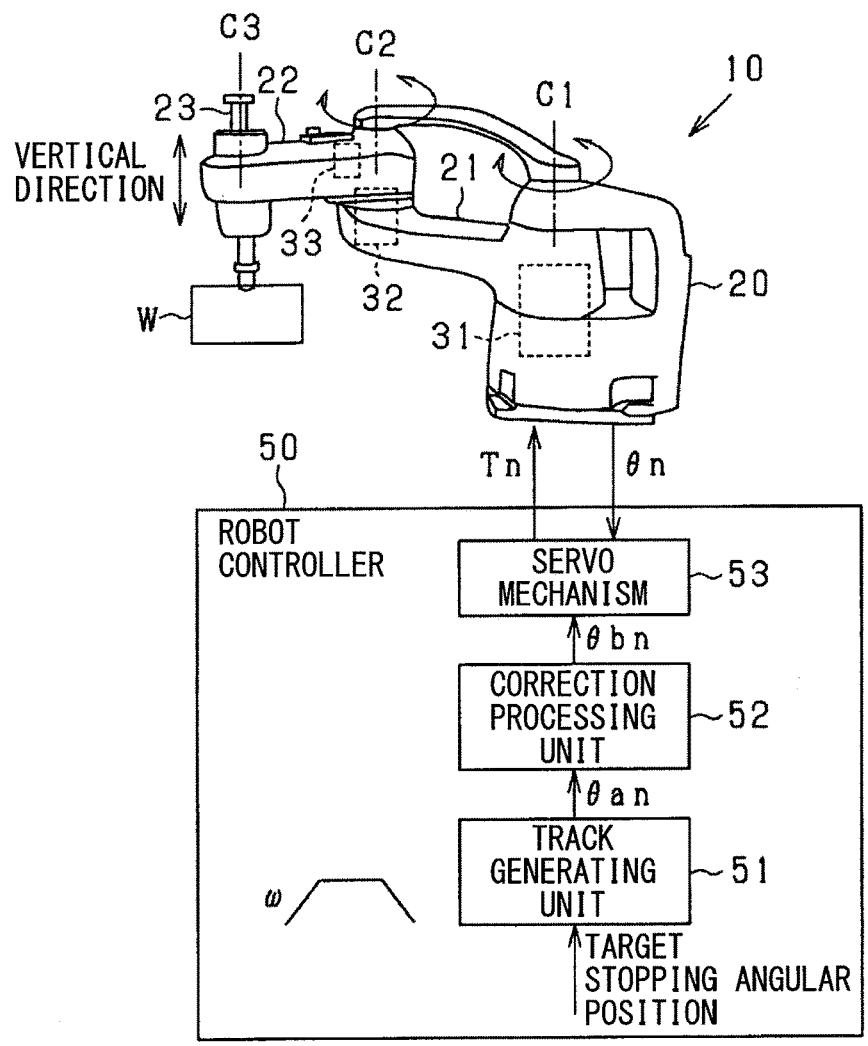
FIG. 1 is a schematic diagram showing a horizontal multi-joint robot and a robot controller.

As shown in FIG. 1, a horizontal multi-joint robot 10 includes a base 20, a first shaft 21, a second shaft 22 and a third shaft 23. According to a first embodiment of the present disclosure, the horizontal multi-joint robot 10 is referred to as a robot 10.

The base 20 is fastened to a ground. The first shaft 21 is horizontally rotatably connected with the base 20 through a bearing. The first shaft 21 is horizontally rotatable relative to a first shaft line C1 that is equivalent to a center axis that is predetermined as a center. The first shaft 21 has a tip end portion that is a first moving unit that is equivalent to a moving unit. The first moving unit is slidable along a first arc track that is predetermined around the first shaft line C1 as a center, in a horizontal surface.

The second shaft 22 is horizontally rotatably connected with the tip end portion of the first shaft 21. The second shaft 22 is horizontally rotatable relative to a second shaft line C2 as a center. The second shaft 22 has a tip end portion that is a second moving unit. The second moving unit is movably supported by the first moving unit and is slidable along a second arc track that is predetermined around the first moving unit as a center, in a horizontal surface. In this case, the second arc track is equivalent to a predetermined arc track and a predetermined track.

The third shaft 23 is vertically movably connected with the tip end portion of the second shaft 22. The third shaft 23 that is equivalent to a predetermined shaft is slidably supported by the second moving unit in a vertical direction along a third shaft line C3. The third shaft 23 is horizontally rotatable relative to the third shaft line C3 as a center. The third shaft 23 has a lower part to which a subject W equivalent to a tool, a work or a component that executes a predetermined operation is assembled.

A first driving unit 31 horizontally rotatably driving the first shaft 21 is fastened to the base 20. The first driving unit 31 that is equivalent to a driving unit includes a motor, a transmission mechanism and a decelerator mechanism. In this case, the motor includes an output shaft connected with a base end portion of the first shaft 21 through the transmission mechanism and the decelerator mechanism. The decelerator mechanism is fastened to the base 20.

A second driving unit 32 horizontally rotatably driving the second shaft 22 is fastened to the first shaft 21. The second driving unit 32 that is equivalent to the driving unit includes a motor, a transmission mechanism and a decelerator mechanism. In this case, the motor includes an output shaft connected with a base end portion of the second shaft 22 through the transmission mechanism and the decelerator mechanism.

A third driving unit 33 vertically movably driving the third shaft 23 is fastened to the second shaft 22. The third driving unit 33 includes a motor, a transmission mechanism and a decelerator mechanism. In this case, the motor includes an output shaft connected with the third shaft 23 through the transmission mechanism and the decelerator mechanism. According to the present embodiment, the transmission mechanism and the decelerator mechanism include a belt, a pulley and a ball screw nut.

A fourth driving unit horizontally rotatably driving the third shaft 23 is fastened to the second shaft 22. The fourth driving unit that is not shown includes a motor, a transmission mechanism and a decelerator mechanism. In this case, the motor includes an output shaft connected with the third shaft 23 through the transmission mechanism and the decelerator mechanism.

As the above configuration, the first shaft 21 is horizontally rotatably driven by the first driving unit 31. The first shaft 21 is supported by a bearing and is driven to horizontally rotate. The second shaft 22 is horizontally rotatably driven by the second driving unit 32. The second shaft 22 is supported by a bearing and is driven to horizontally rotate. The third shaft 23 is vertically movably driven by the third driving unit 33. The third shaft 23 is horizontally rotatably driven by the fourth driving unit.

A robot controller 50 controls an operation of the robot 10. According to the present embodiment, the robot controller 50 is referred to as a controller 50. The controller 50 that is equivalent to a control device includes a CPU, a ROM, a RAM, a driving circuit and a position sensing circuit. The ROM stores a system program of the robot 10 and an operation program of the robot 10. The RAM stores a value a parameter of when the above programs are executed. The position sensing circuit receives sensing signals of encoders provided in joints of the robot 10, respectively. According to the present embodiment, the encoders are not shown. The position sensing circuit senses rotation angular positions of motors provided in joints based on the sensing signals of the encoders, respectively. The controller 50 includes a track generating unit 51, a correction processing unit 52 and a servo mechanism 53.

The controller 50 calculates a target stopping position of the tip end portion of the second shaft 22 based on the operation program of the robot 10. The controller 50 calculates a target stopping angular position of each shaft based on the target stopping position. The track generating unit 51 generates an angular speed pattern of each shaft of when an angular position θn of each shaft is changed to the target stopping angular position, based on the target stopping angular position of each shaft. The track generating unit 51 calculates an instruction value θan that is a latest target angular position of each shaft, based on the angular speed pattern of each shaft. The servo mechanism 53 that is equivalent to a driving control unit controls each of the driving units 31 to 33 at a driving torque Tn based on the angular position en and the instruction value θan of each shaft sensed by encoders, and controls the angular position of each shaft to be the instruction value θan. According to the present embodiment, n may be 1 or 2.

Figure 2:
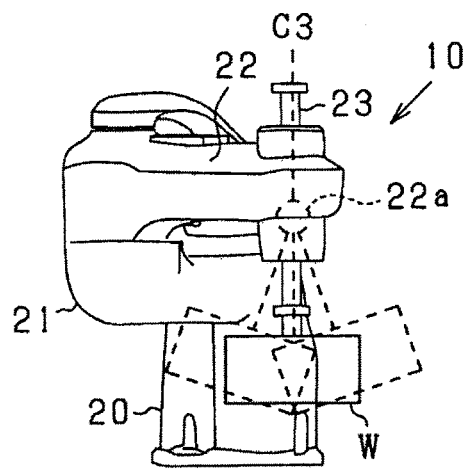
FIG. 2 is a schematic diagram showing a vibration state of a third shaft.

However, when the first shaft 21 is horizontally rotatably driven or when the second shaft 22 is horizontally rotatably driven, it is possible that a tip end of the third shaft 23 vibrates. FIG. 2 is a schematic diagram showing a vibration state of the third shaft 23.

The third shaft 23 is slidably supported by a support portion 22a of the second shaft 22, along the third shaft line C3. The support portion 22a that is equivalent to the second moving unit and the moving unit is constituted by the transmission mechanism and the decelerator mechanism of the third driving unit 33, and has a rigidity lower than that of a frame of the second shaft 22 and that of the third shaft 23. According to the present embodiment, the frame of the second shaft 22 is equivalent to a driven unit. The support portion 22a functions as a spring element having a spring constant K relative to a force in direction twisting the third shaft 23. Thus, when the tip end portion of the second shaft 22 is accelerated or decelerated, the tip end of the third shaft 23 vibrates relative to the support portion 22a as a center according to an inertial force applied to the third shaft 23 and the subject W. The larger a mass of the subject W is, the larger a vibration of the tip end of the third shaft 23 is. Further, the longer a distance between the support portion 22a and the subject W is, the larger the vibration is.

Figure 3:
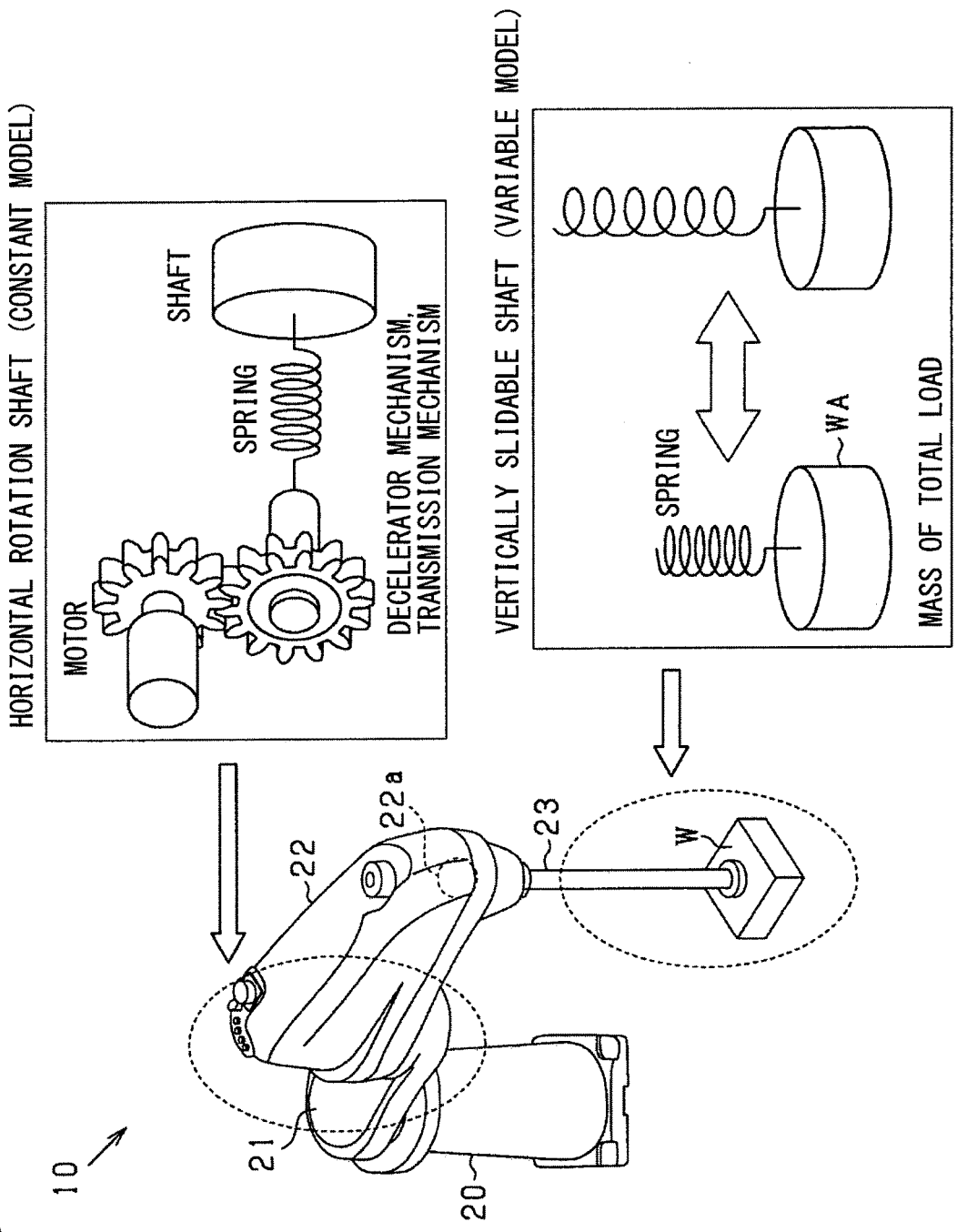
FIG. 3 is a schematic diagram showing an operation model of the horizontal multi-joint robot.

According to the present embodiment, the controller 50 executes a vibration suppressing control to suppress the vibration of the third shaft 23 in a case where the controller 50 estimates an operation model of the robot 10 as shown in FIG. 3. As shown in FIG. 3, the first shaft 21 and the second shaft 22 that are horizontal rotation shafts of the robot 10 use constant model where support states of the shafts 21 and 22 do not change. Further, the third shaft 23 that is a vertically slidable shaft of the robot 10 uses a variable model where a position of the third shaft 23 supported by the support portion 22a changes. A total load WA is obtained by calculating a sum of the third shaft 23 and the subject W. Further, the total load WA has a gravity center where a mass M of the total load WA exists.

FIGS. 4A to 4J are schematic diagrams showing relationships between target positions and gravity positions of when the second shafts 22 are activated, in the present embodiment and a comparison example. FIGS. 4A to 4E show the comparison example where a position of the support portion 22a of the second shaft 22 is controlled to match a target position indicated by a dashed line corresponding to the instruction value θa1 and the instruction value θa2 of the first shaft 21 and the second shaft 22. According to the present embodiment, the support portion 22a of the second shaft 22 is equivalent to the tip end portion of the second shaft 22. FIGS. 4F to 4J show the present embodiment where a position of a gravity center of the total load WA which is projected on a horizontal surface H is controlled to match a target position indicated by a dashed line corresponding to the instruction value Gal and the instruction value θa2 of the first shaft 21 and the second shaft 22. According to the present embodiment, the horizontal surface H is referred to as a horizontal track H.

As shown in FIGS. 4A to 4E, in the comparison example, when the support portion 22a is accelerated at an acceleration speed a, the inertial force (−Ma) in a direction opposing a moving direction of the support portion 22a is applied to the total load WA. Thus, the support portion 22a is elastically deformed, the gravity center of the total load WA which is projected on the horizontal surface H moves in delay of the support portion 22a. When the support portion 22a is maintained to move in a constant speed, the inertial force (−Ma) becomes smaller, and an elastic deformation of the support portion 22a is returned to an initial shape of the support portion 22a. When the elastic deformation of the support portion 22a is returned to the initial shape of the support portion 22a, a vibration is generated at the third shaft 23.

Then, when the support portion 22a is decelerated at a deceleration speed (−a), the inertial force Ma in a direction along the moving direction of the support portion 22a is applied to the total load WA. Thus, the support portion 22a is elastically deformed, the gravity center of the total load WA which is projected on the horizontal surface H moves in advance of the support portion 22a. When a movement of the support portion 22a is completed, the inertial force Ma becomes smaller, and the elastic deformation of the support portion 22a is returned to the initial shape of the support portion 22a. When the elastic deformation of the support portion 22a is returned to the initial shape of the support portion 22a, the vibration is generated at the third shaft 23.

As show in FIGS. 4F to 4J, in the present embodiment, when the support portion 22a is accelerated at the acceleration speed a, the inertial force (−Ma) in a direction opposing the moving direction of the support portion 22a is applied to the total load WA. According to the present embodiment, when the support portion 22a is accelerated, the support portion 22a is controlled to be in advance of the target position indicated by the dashed line. Specifically, the position of the gravity center of the total load WA which is projected on the horizontal surface H is controlled to match the target position indicated by the dashed line, by considering a quantity where the support portion 22a is elastically deformed. Then, when the support portion 22a is maintained to move in a constant speed, the inertial force (−Ma) becomes smaller, and an advancing quantity of the support portion 22a relative to the target position is decreased to make the elastic deformation of the support portion 22a be returned to the initial shape of the support portion 22a. Thus, when the elastic deformation of the support portion 22a is returned to the initial shape of the support portion 22a, it can be suppressed that the vibration is generated at the third shaft 23.

Then, when the support portion 22a is decelerated at a deceleration speed (−a), the inertial force Ma in a direction along the moving direction of the support portion 22a is applied to the total load WA. According to the present embodiment, when the support portion 22a is decelerated, the support portion 22a is controlled to be in delay of the target position indicated by the dashed line. Specifically, the position of the gravity center of the total load WA which is projected on the horizontal surface H is controlled to match the target position indicated by the dashed line, by considering the quantity where the support portion 22a is elastically deformed. When the movement of the support portion 22a is completed, the inertial force Ma becomes smaller, and a delaying quantity of the support portion 22a relative to the target position is decreased to make the elastic deformation of the support portion 22a be returned to the initial shape of the support portion 22a. Thus, when the elastic deformation of the support portion 22a is returned to the initial shape of the support portion 22a, it can be suppressed that the vibration is generated at the third shaft 23.

Figure 5:
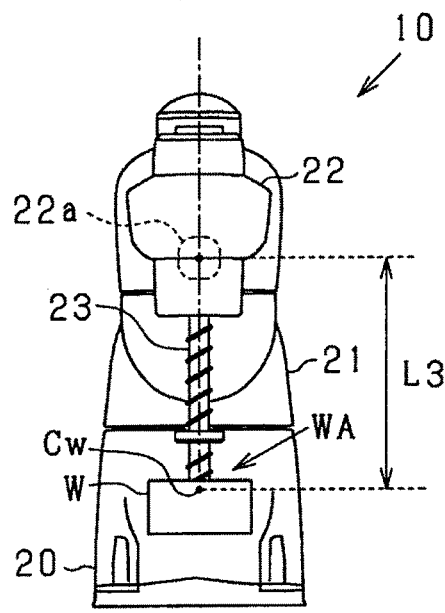
FIG. 5 is a front view showing a gravity center distance.

As shown in FIG. 5, when the tip end portion of the second shaft 22 is accelerated or decelerated, the inertial force that is as same as an inertial force of when the mass M of the total load WA exists is applied to a position from which to the support portion 22a of the second shaft 22 supporting the third shaft 23 defining a gravity center distance L3. In this case, the position is equivalent to the gravity center Cw of the total load WA of the third shaft 23 and the subject W. Since the third shaft 23 is slidably supported in the vertical direction, the gravity center distance L3 changes according to an operation state of the third shaft 23, and a height of the inertial force that is applied changes. According to the present embodiment, the correction processing unit 52 that is equivalent to a gravity-center distance calculation unit calculates the gravity center distance L3 based on the gravity center of the total load WA and the position of the third shaft 23 in the vertical direction. The position of the third shaft 23 in the vertical direction can be calculated based on the instruction value driving the third shaft 23 and/or the sensing signal of the encoder. The gravity center of the total load WA can be calculated based on a length and a mass of the third shaft 23 and a height, a width and a mass of the subject W.

Figure 6:
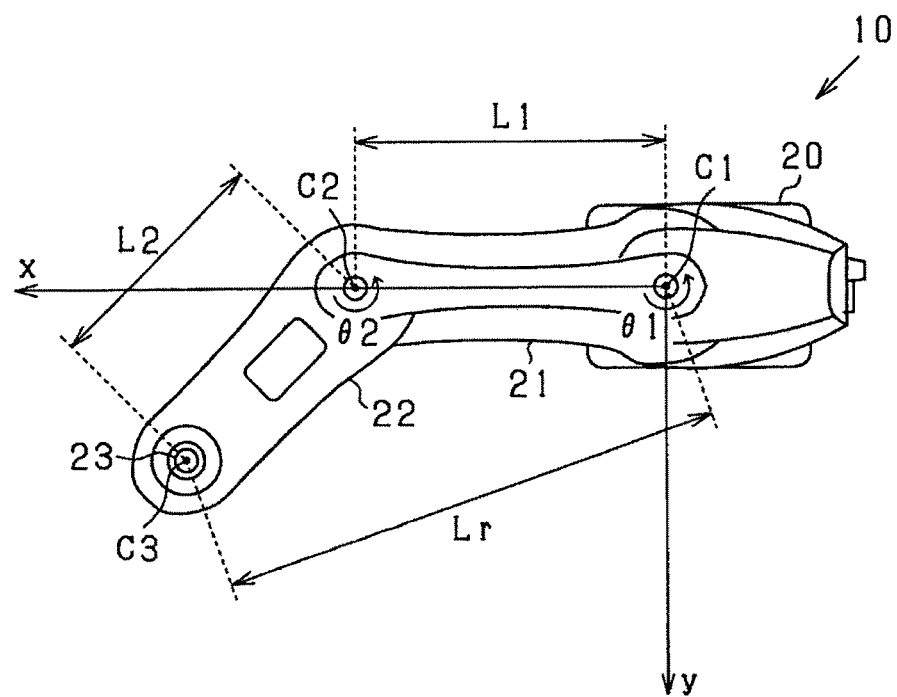
FIG. 6 is a plan view showing lengths and angular positions of a first shaft and the second shaft.

FIG. 6 is a plan view showing lengths and angular positions of the first shaft 21 and the second shaft 22. As shown in FIG. 6, a first length L1 is a length from the first shaft line C1 that is a rotation center of the first shaft 21 to the second shaft line C2 that is a rotation center of the second shaft 22. A second length L2 is a length from the second shaft line C2 to the third shaft line C3 that is a center axis of the third shaft 23. A front direction of the base 20 is referred to as an x-axis. A first angle θ1 is an angle defined between a longitudinal direction of the first shaft 21 and the x-axis. A second angle θ2 is an angle defined between a longitudinal direction of the second shaft 22 and the longitudinal direction of the first shaft 21.

When the first shaft 21 and the second shaft 22 horizontally rotate, the acceleration speed a is an acceleration speed of the tip end portion of the second shaft 22, and an angular accelerating speed aω is an angular accelerating speed of a rotation of the second shaft 22. According to the present embodiment, the tip end portion of the second shaft 22 is equivalent to a position of the third shaft line C3. A distance Lr is a distance between the first shaft C1 and the third shaft C3. In this case, a formula (i) is met as following.

$$a = a\omega \times Lr \quad \text{(i)}$$

When the mass M is a mass of the total load WA of the third shaft 23 and the subject W, the inertial force F applied to the total load WA is obtained by a formula (ii) as following.

$$F = M \times a \quad \text{(ii)}$$

When the gravity center distance L3 is defined as the above description, a torque T applied to the support portion 22a of the second shaft 22 is obtained by a formula (iii) as following.

$$T = F \times L3 \quad \text{(iii)}$$

When a spring constant K is a spring constant of the support portion 22a relative to a twisting of the third shaft 23, a displacement quantity Δd of the gravity center of the total load WA generated due to the inertial force F relative to a track is obtained by a formula (iv) as following.

$$\Delta d = L3 \times T/K \quad \text{(iv)}$$

A correction quantity Δθ that is a rotation angular quantity of the support portion 22a and is used to cancel the displacement quantity Δd is obtained by a formula (v) as following.

$$\Delta\theta = \Delta d/Lr \quad \text{(v)}$$

A formula (vi) as following is obtained by substituting formulas (i) to (iv) into the formula (v). $L3^2$ is a square of L3.

$$\Delta\theta = M \times L3^2 \times a\omega/K \quad \text{(vi)}$$

Thus, the correction quantity Δθ can be calculated based on the mass M and the spring constant K that are known constants, the angular accelerating speed aω of the rotation of the second shaft 22, and the gravity center distance L3.

Figure 7:
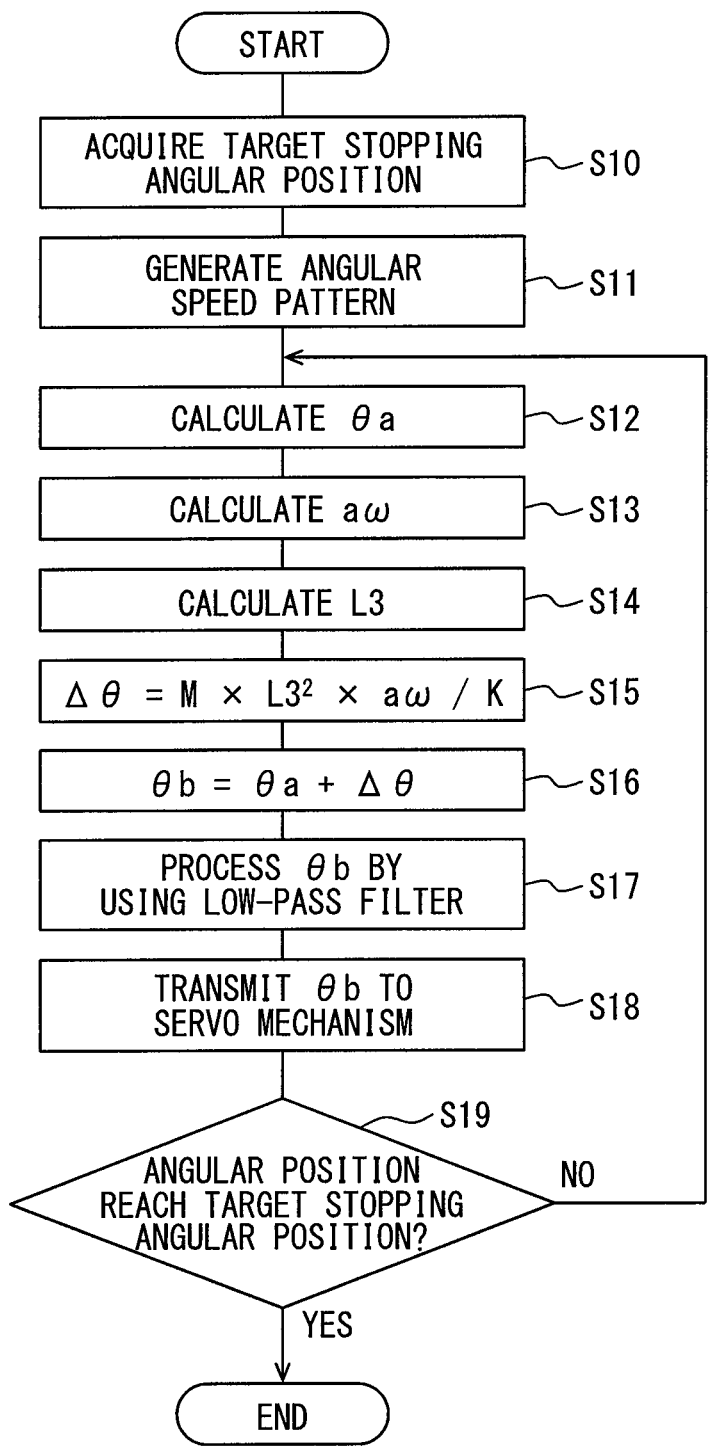
FIG. 7 is a flowchart showing a vibration suppressing control according to the first embodiment.

FIG. 7 is a flowchart showing the vibration suppressing control according to the present embodiment. The vibration suppressing controls including plural processings that are executed by the controller 50 relative to each of the horizontal rotation shafts of the robot 10. In this case, a horizontal rotation shaft that is a control subject is an nth shaft.

At S10, the track generating unit 51 acquires the target stopping angular position of the nth shaft. At S11, the track generating unit 51 generates the angular speed pattern of the nth shaft based on the target stopping angular position of the nth shaft. In this case, the track generating unit 51 generates the angular speed pattern of a trapezoid corresponding to an instruction angular speed indicated by a dashed line shown in FIG. 8. At S12, the track generating unit 51 calculates the instruction value θa of the angular position of the nth shaft, based on the angular speed pattern that is generated at S11. The instruction value θa is equivalent to the target angular position of the nth shaft in a present control cycle. Since each of the horizontal rotation shafts is controlled by the instruction value θa, the tip end portion of the second shaft 22 is controlled to be at the target position in the present control cycle. In this case, the target position in the present control cycle is a latest target position.

At S13, the correction processing unit 52 calculates the angular accelerating speed aω of the rotation of the nth shaft, based on an angular speed ω of the rotation of the nth shaft. Specifically, the correction processing unit 52 uses a difference between the angular speed ω(k) that is a present value and the angular speed ω(k−1) that is a latest value as the angular accelerating speed aω. In other words, the angular accelerating speed aω is equivalent to an accelerating speed of when the instruction value θa changes. At S14, the correction processing unit 52 calculates the gravity center distance L3 as the above description. At S15, the correction processing unit 52 calculates the correction quantity $\Delta\theta$ by using the formula (vi). At S16, the correction processing unit 52 calculates a correction instruction value $\theta b$ by adding the correction quantity $\Delta\theta$ to the instruction value $\theta a$.

At S17, the correction processing unit 52 processes the correction instruction value $\theta b$ by using a low-pass filter. At S18, the correction processing unit 52 transmits the correction instruction value $\theta b$ after the correction instruction value $\theta b$ is filtered at S17 to the servo mechanism 53. In other words, the correction processing unit 52 changes the correction instruction value $\theta b$ to an instruction value obtained by filtering the correction instruction value $\theta b$ that is calculated at S16, and transmits the correction instruction value that is changed to the servo mechanism 53.

At S19, the correction processing unit 52 determines whether the angular position of the nth shaft reaches the target stopping angular position, based on the sensing signal of the encoder that is provided at the nth shaft. When the correction processing unit 52 determines that the angular position of the nth shaft does not reach the target stopping angular position (S19: No), the correction processing unit 52 returns to S12 to execute processings from S12. When the correction processing unit 52 determines that the angular position of the nth shaft reaches the target stopping angular position (S19: Yes), the correction processing unit 52 terminates the present vibration suppressing control.

According to the present embodiment, the processing in S12 is equivalent to an instruction value calculating unit, the processing in S13 is equivalent to an accelerating-speed calculating unit, the processing in S14 is equivalent to a gravity-center distance calculating unit, and processings in S15 to S18 are equivalent to a correction instruction-value calculating unit.

Figure 8:
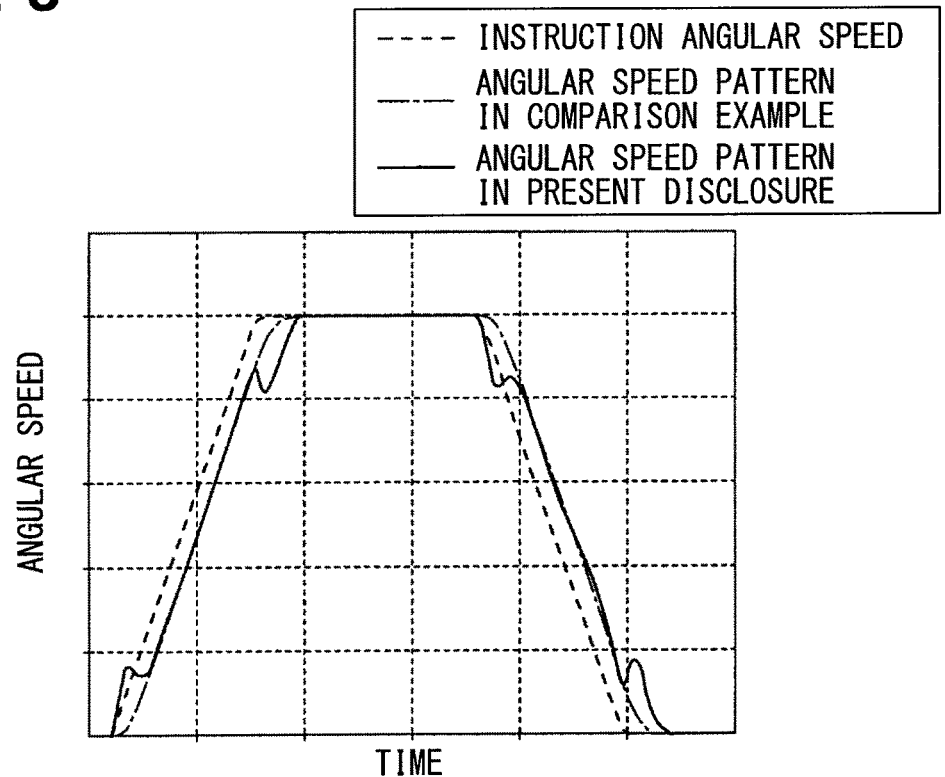
FIG. 8 is a time chart showing angular speed patterns in the first embodiment and a comparison example.

FIG. 8 is a time chart showing angular speed patterns according to the present embodiment and a comparison example. The dashed line shown in FIG. 8 indicates the instruction angular speed that is equivalent to the angular speed pattern generated at S11 shown in FIG. 7. As shown in FIG. 8, a dashed dotted line indicates the angular speed pattern that is the angular speed achieved when the instruction value $\theta a$ calculated at S12 based on the angular speed pattern that is generated is transmitted to the servo mechanism 53 in the comparison example. Further, as shown in FIG. 8, a solid line indicates the angular speed pattern that is the angular speed achieved when the vibration suppressing control of the present embodiment is executed as shown in FIG. 7.

As shown in FIG. 8, when the second shaft 22 starts to be accelerated from a stopping state, a timing that the angular speed starts to be increased in the present embodiment is earlier than that in the comparison example. In the stopping state, the second shaft 22 is completely stopped. Thus, according to the present embodiment, the position of the gravity center of the total load WA which is projected on the horizontal track H can be controlled to match the latest target position of the support portion 22a of the second shaft 22. In this case, since the correction instruction value $\theta b$ is processed by the low-pass filter at S17 shown in FIG. 7, a sharp change of the correction instruction value $\theta b$ is suppressed. When the driving units 31 and 32 are controlled based on the correction instruction value $\theta b$, it is suppressed that the angular speeds of the shafts 21 and 22 sharply change.

When the second shaft 22 is controlled from an accelerating state to a constant state, a timing that the angular speed starts to be constant in the present embodiment is slower than that in the comparison example. In the accelerating state, the second shaft 22 is accelerated. In the constant state, the second shaft 22 is controlled to move at a constant speed. Thus, according to the present embodiment, since the acceleration speed is decreased when the elastic deformation of the support portion 22a of the second shaft 22 is returned to the initial shape of the support portion 22a, the position of the gravity center of the total load WA which is projected on the horizontal track H can be controlled to match the latest target position of the support portion 22a. When the driving units 31 and 32 are controlled based on the correction instruction value $\theta b$ after the correction instruction value $\theta b$ is filtered, it is suppressed that the angular speeds of the shafts 21 and 22 sharply change.

When the second shaft 22 is controlled from the constant state to a decelerating state, a timing that the angular speed starts to be decreased in the present embodiment is earlier than that in the comparison example. In the decelerating state, the second shaft 22 is decelerated. Thus, according to the present embodiment, the position of the gravity center of the total load WA which is projected on the horizontal track H can be controlled to match the latest target position of the support portion 22a. When the driving units 31 and 32 are controlled based on the correction instruction value $\theta b$ after the correction instruction value is processed by the low-pass filter, it can be suppressed that the angular speeds of the shafts 21 and 22 sharply change.

When the second shaft 22 is controlled from the decelerating state to a movement terminating state, a timing that the angular speed starts to be decreased in the present embodiment is slower than that in the comparison example. In the movement terminating state, the second shaft 22 is controlled to gradually become static. Thus, according to the present embodiment, since a decelerating speed is decreased when the elastic deformation of the support portion 22a of the second shaft 22 is returned to the initial shape of the support portion 22a, the position of the gravity center of the total load WA which is projected on the horizontal track H can be controlled to match the latest target position of the support portion 22a. When the driving units 31 and 32 are controlled based on the correction instruction value $\theta b$ after the correction instruction value $\theta b$ is processed by the low-pass filter, it is suppressed that the angular speeds of the shafts 21 and 22 sharply change.

Figure 9:
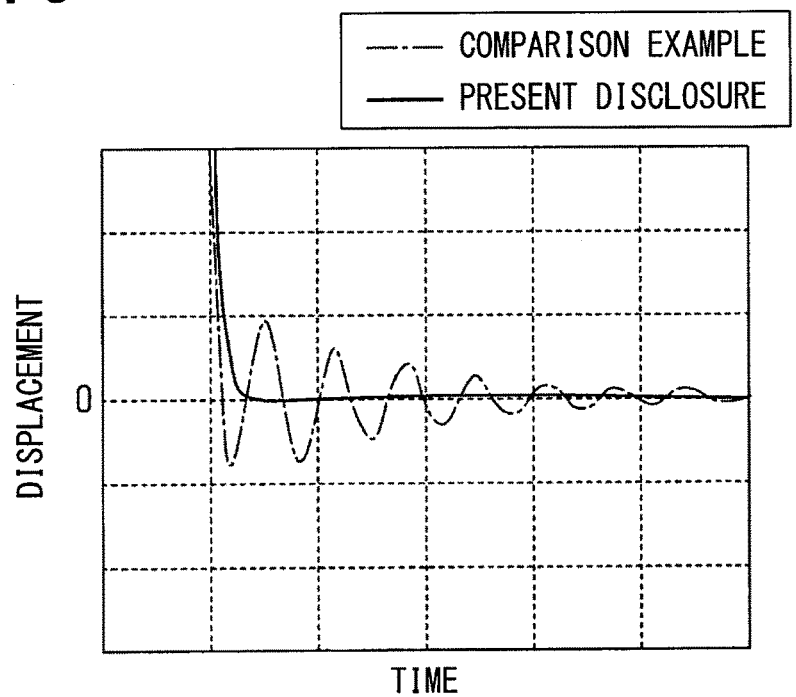
FIG. 9 is a time chart showing displacements between target stopping positions and projecting positions of gravity centers in the first embodiment and in a comparison example, respectively.

FIG. 9 is a time chart showing displacements between target stopping positions and projecting positions of gravity centers in the present embodiment and in a comparison example, respectively. In this case, the projecting position of the gravity center is the position of the gravity center of the total load which is projected on the horizontal track, and is also referred to as a gravity position. The comparison example shown in FIG. 9 is equivalent to the comparison example shown in FIG. 8.

As shown in FIG. 9, in the comparison example indicated by a dashed dotted line, the displacement between the target stopping position and the projecting position of the gravity center alternates between positive values and negative values which are relatively large. In other words, the third shaft 23 vibrates at a supporting point that is the support portion 22a of the second shaft 22, in a moving direction of the support portion 22a of the second shaft 22. In contrast, according to the present embodiment indicated by a solid line, the displacement between the target stopping position and the projecting position of the gravity center is a value close to zero. Thus, the vibration of the third shaft 23 generated at the supporting point that is the support portion 22a of the second shaft 22 is effectively suppressed.

The present embodiment can achieve following effects.

Since the third shaft 23 is slidably supported in the vertical direction, the gravity center distance L3 changes according to the operation state of the third shaft 23, and the height of the inertial force that is applied changes. In this case, the gravity-center distance calculating unit that is equivalent to the processing at S14 calculates the gravity center distance L3 based on the gravity center of the total load WA and the position of the third shaft 23 in the vertical direction. The correction instruction-value calculating unit that is equivalent to the processings in S15 and S16 calculates the correction instruction value θb by correcting the instruction value θa calculated by the instruction value calculating unit that is equivalent to the processing at S12, based on the instruction value θa, the spring constant K, the mass of the total load WA, the angular accelerating speed aω of when by the instruction value θa changes, and the gravity center distance L3, such that the position of the gravity center of the total load WA which is projected on the predetermined track approaches the latest target position. According to the present disclosure, the predetermined track is equivalent to the horizontal track H. The servo mechanism 53 controls the driving units 31 and 32 based on the correction instruction value θb that is calculated. Thus, when the displacement between the gravity position and the target position is cancelled, it can be suppressed that the vibration is generated at the third shaft 23. Further, since the correction instruction value θb can be calculated based on the instruction value θa, a known value that is the spring constant K, the angular accelerating speed aω of the instruction value θa and the gravity center distance L3 without arranging an acceleration sensor at a position where the vibration is actually generated, the control device can be readily actually applied to the robot 10.

According to the above description, the robot includes the driving unit, the moving unit and the predetermined shaft. The moving unit is driven by the driving unit and is slidable along the predetermined track in the horizontal surface. The predetermined shaft is slidably supported by the moving unit in the vertical direction, and the subject is assembled to the predetermined shaft.

The instruction value calculating unit calculates the instruction value that drives the driving unit such that the moving unit is moved to the latest target position. The accelerating-speed calculating unit calculates the accelerating speed of when the instruction value calculated by the instruction value calculating unit changes. The accelerating speed of when the instruction value changes is correlative to an accelerating speed where the moving unit is moved to the latest target position.

When the moving unit is accelerated or decelerated, the inertial force that is as same as an inertial force of when the mass of the total load exists is applied to a position of the gravity center distance defined from the support portion of the moving unit supporting the predetermined shaft to the gravity center of the total load of the predetermined shaft and the subject. In this case, since the predetermined shaft is slidably supported in the vertical direction, the gravity center distance changes according to an operation state of the predetermined shaft, and a height of the inertial force that is applied changes. The gravity-center distance calculating unit calculates the gravity center distance based on the gravity center of the total load and the position of the predetermined shaft in the vertical direction.

The position of the gravity center of the total load which is projected on the predetermined track displaces from the target position by the inertial force according to the spring constant of the support portion relative to the twisting of the predetermined shaft. When the position of the gravity center which is projected on the predetermined track is different from the target position, a vibration is generated at the predetermined shaft in a case where the displacement is cancelled. The inertial force can be calculated based on the mass of the total load, and the accelerating speed of when the instruction value changes. Further, a quantity that the position of the gravity center which is projected on the predetermined track displaces from the target position can be calculated based on the inertial force, the gravity center distance and the spring constant.

The correction instruction-value calculating unit calculates the correction instruction value by correcting the instruction value calculated by the instruction value calculating unit, based on the instruction value, the spring constant, the mass of the total load, the accelerating speed of when the instruction value changes and the gravity center distance, such that the position of the gravity center which is projected on the predetermined track approaches the target position. In other words, the correction instruction-value calculating unit calculates the correction instruction value by correcting the instruction value so as to decrease a displacement between the position of the gravity center and the target position. The driving control unit controls the driving unit based on the correction instruction value that is calculated. Thus, when the displacement between the position of the gravity center and the target position is cancelled, it can be suppressed that the vibration is generated at the predetermined shaft. Further, since the correction instruction value can be calculated based on the instruction value, a known value that is the spring constant, the accelerating speed of the instruction value and the gravity center distance without arranging an acceleration sensor at a position where the vibration is actually generated, the control device can be readily actually applied to the robot.

When the support portion 22a of the second shaft 22 is accelerated, the inertial force is applied to the total load WA of the third shaft 23 and the subject W in a direction opposing the moving direction of the support portion 22a of the second shaft 22. Thus, the gravity center of the total load WA which is projected on the predetermined track moves in delay relative to the support portion 22a of the second shaft 22. When the support portion 22a of the second shaft 22 is in the accelerating state, the correction instruction-value calculating unit calculates the correction instruction value θb such that the support portion 22a of the second shaft 22 is controlled to be in advance of the target position. Thus, the correction instruction-value calculating unit can calculate the correction instruction value θb to decrease the displacement between the position of the gravity center which is projected on the predetermined track and the target position.

When the support portion 22a of the second shaft 22 is decelerated, the inertial force is applied to the total load WA of the third shaft 23 and the subject W in a direction along the moving direction of the support portion 22a of the second shaft 22. Thus, the gravity center of the total load WA which is projected on the predetermined track moves in advance relative to the support portion 22a of the second shaft 22. When the support portion 22a of the second shaft 22 is in the decelerating state, the correction instruction-value calculating unit calculates the correction instruction value θb such that the support portion 22a of the second shaft 22 is controlled to be in delay of the target position. Thus, the correction instruction-value calculating unit can calculate the correction instruction value θb to decrease the displacement between the position of the gravity center which is projected on the predetermined track and the target position.

The correction instruction-value calculating unit calculates the correction instruction value θb such that the position of the gravity center which is projected on the predetermined track matches the target position. Thus, the displacement between the position of the gravity center which is projected on the predetermined track and the target position can be minimized, and it can be further suppressed that the vibration is generated at the third shaft 23.

When the angular accelerating speed aω of the instruction value θa sharply changes, it is possible that the correction instruction value θb calculated based on the angular accelerating speed aω of the instruction value θa sharply changes. In this case, a torque greater than an upper limit torque that can be generated by the driving units 31 and 32 that are controlled based on correction instruction values θb may be requested at the driving units 31 and 32. The correction instruction-value calculating unit changes the correction instruction value θb to an instruction value obtained by filtering the correction instruction value θb that is calculated. Thus, it can be suppressed that the correction instruction value θb sharply changes and the torque greater than the upper limit torque is requested at the driving units 31 and 32.

The support portion 22a of the second shaft 22 is slidable along the predetermined arc track around the second shaft line C2 as a center, in a horizontal surface. In this case, the target angular position θ of the support portion 22a relative to the shaft line C2 as a center, which corresponds to the target position, can be used as the instruction value θ driving the second driving unit 32, to move the support portion 22a of the second shaft 22 to the latest target position. The correction instruction-value calculating unit can calculate the correction instruction value θb by adding the correction quantity Δθ calculated by using a formula that Δθ=M×aω×L²/K to the instruction value θa. Thus, the correction instruction value θb can be readily calculated, and the control device can be readily actually applied to the robot 10.

The robot 10 is the horizontal multi-joint robot 10 including the first shaft 21 that rotates in a horizontal surface, the second shaft 22 that is rotatably supported by the first shaft 21 in a horizontal surface, and the third shaft 23 that is movable relative to the tip end portion of the second shaft 22 in the vertical direction. The instruction value calculating unit, the accelerating-speed calculating unit, the gravity-center distance calculating unit, the correction instruction-value calculating unit and the servo mechanism 53 execute processings relative to the first shaft 21 and the second shaft 22. Thus, in the horizontal multi-joint robot 10, the vibration of the third shaft 23 can be suppressed.

Second Embodiment

In a second embodiment of the present disclosure, the same parts and components as those in the first embodiment are indicated with the same reference numerals and the same descriptions will be omitted.

When the first shaft 21 and the second shaft 22 horizontally rotate, the acceleration speed a is an acceleration speed of the tip end portion of the second shaft 22. According to the present embodiment, the tip end portion of the second shaft is equivalent to the position of the third shaft line C3. When the mass M is a mass of the total load WA of the third shaft 23 and the subject W, the inertial force F applied to the total load WA is obtained by a formula (vii) as following.

$$F=M\times a \quad\quad (vii)$$

When the gravity center distance L3 is defined as the above description, a torque T applied to the support portion 22a of the second shaft 22 is obtained by a formula (viii) as following.

$$T=F\times L3 \quad\quad (viii)$$

When a spring constant K is a spring constant of the support portion 22a relative to a twisting of the third shaft 23, a displacement quantity Δd of the gravity center of the total load WA generated due to the inertial force F relative to a track is obtained by a formula (ix) as following.

$$\Delta d=L3\times T/K \quad\quad (ix)$$

A correction quantity ΔP that is equal to the displacement quantity Δd may be used to cancel the displacement quantity Δd.

A formula (x) as following is obtained by substituting formulas (vii) and (viii) into the formula (ix). L3² is a square of L3.

$$\Delta P=M\times L3^2\times a/K \quad\quad (x)$$

Thus, the correction quantity ΔP can be calculated based on the mass M and the spring constant K that are known constants, the accelerating speed a of the rotation of the support portion 22a of the second shaft 22, and the gravity center distance L3.

Figure 10:
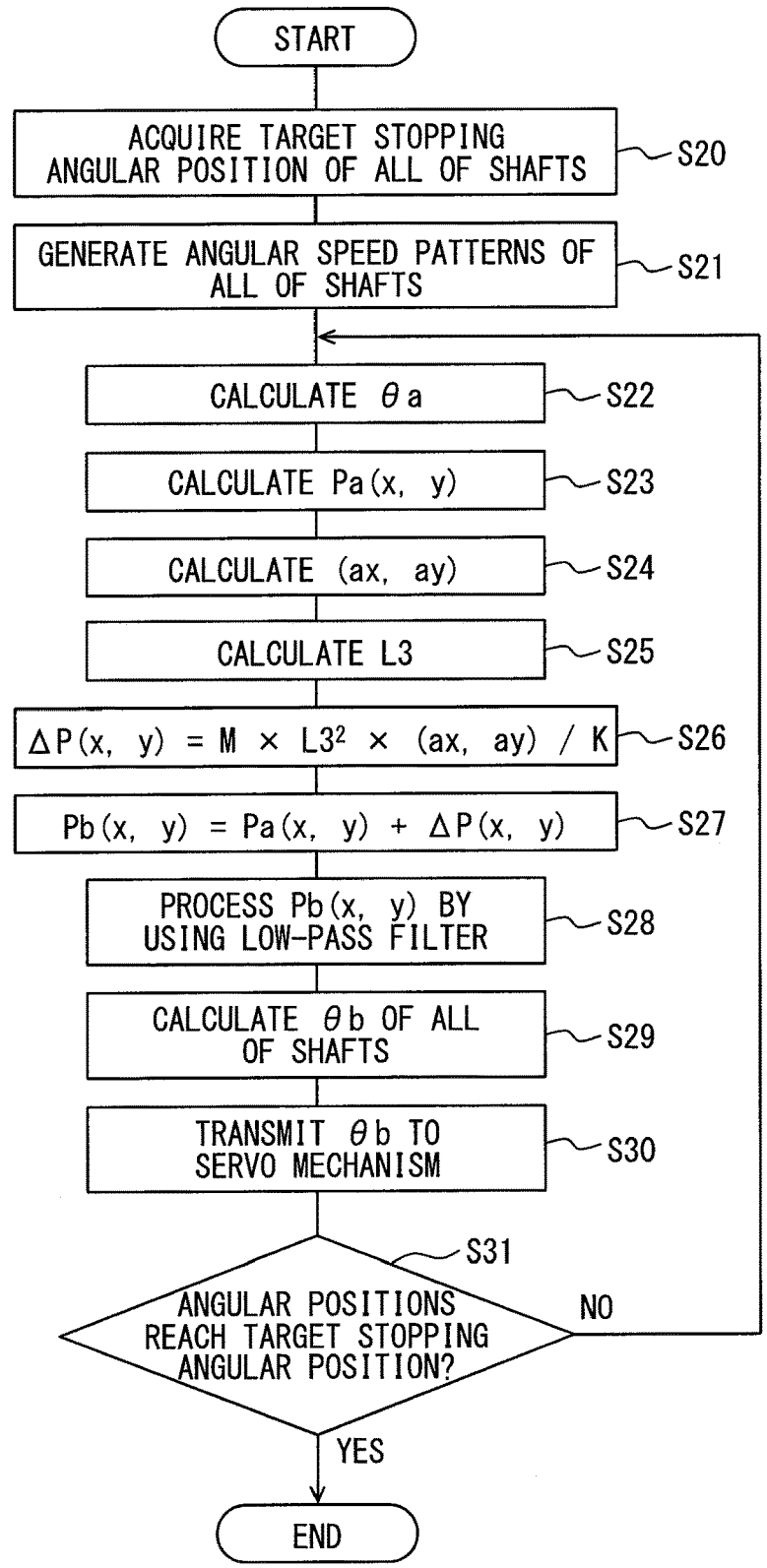
FIG. 10 is a flowchart showing a vibration suppressing control according to a second embodiment of the present disclosure.

FIG. 10 is a flowchart showing the vibration suppressing control according to the present embodiment. The vibration suppressing controls including plural processings that are executed by the controller 50 relative to all of the horizontal rotation shafts of the robot 10.

At S20, the track generating unit 51 acquires the target stopping angular positions of all of the shafts. At S21, the track generating unit 51 the angular speed patterns of all of the shafts based on the target stopping angular positions of all of the shafts. In this case, the track generation unit 51 generates the angular speed patterns of a trapezoid corresponding to an instruction angular speed indicated by a dashed line shown in FIG. 8. At S22, the track generation unit 51 calculates the instruction values θa of the angular positions of all of the shafts, based on the angular speed patterns that are generated at S21. The instruction values θa are equivalent to the target angular positions of all of the shafts in a present control cycle, respectively.

At S23, the correction processing unit 52 calculates a target position Pa(x, y) of the support portion 22a of the second shaft 22, based on the instruction values θa of the angular positions of all of the shafts. The target position Pa(x, y) is equivalent to a latest target position that is the target position in the present control cycle.

At S24, the correction processing unit 52 calculates accelerating speeds a(x, y) of the target position Pa(x, y) based on the target position Pa(x, y). Specifically, the correction processing unit 52 uses a difference between x(k) that is an x component of a present target position Pa(k) and x(k−1) that is an x component of a latest target position Pa(k−1) as the accelerating speed a(x). Similarly, the correction processing unit 52 uses a difference between y(k) that is a y component of the present target position Pa(k) and y(k−1) that is a y component of the latest target position Pa(k−1) as the accelerating speed a(y). At S25, the correction processing unit 52 calculates the gravity center distance L3 as the above description. At S26, the correction processing unit 52 calculates the correction quantity ΔP(x, y) by using the formula (x). At S27, the correction processing unit 52 calculates the correction target position Pb(x, y) by adding the correction quantity ΔP(x, y) to the target position Pa(x, y).

At S28, the correction processing unit 52 processes the correction target position Pb(x, y) by using a low-pass filter. In other words, the correction processing unit 52 changes the correction target position Pb(x, y) to a target position obtained by filtering the correction target position Pb(x, y) that is calculated at S27.

At S29, the correction processing unit 52 calculates the correction instruction values θb of all of the shafts, based on the correction target position Pb(x, y) that is processed by the low-pass filter. The correction instruction values θb that are equivalent to a first correction instruction value and a second correction instruction value are the instruction values of all of the shafts where the tip end portion of the second shaft 22 is moved to the correction target position Pb(x, y). The correction processing unit 52 can calculate the correction target position Pb(x, y) by executing a known converting processing. At S30, the correction processing unit 52 transmits the correction instruction values θb of all of the shafts to the servo mechanism 53.

At S31, the correction processing unit 52 determines whether the angular positions of all of the shafts reach the target stopping angular positions of all of the shafts, based on the sensing signals of the encoders arranged at all of the shafts. When the correction processing unit 52 determines that at least one of the angular positions does not reach the target stopping angular position (S31: No), the correction processing unit 52 returns to S22 to execute processings from S22. When the correction processing unit 52 determines that the angular positions of all of the shafts reach the target stopping angular positions of all of the shafts (S31: Yes), the correction processing unit 52 terminates the present vibration suppressing control.

According to the present embodiment, the processing in S23 is equivalent to a target position calculating unit, the processing in S24 is equivalent to an accelerating-speed calculating unit, the processing in S25 is equivalent to a gravity-center distance calculating unit, the processings in S26 to S28 are equivalent to a correction target-position calculating unit, and the processing in S29 is equivalent to a correction instruction-value calculating unit.

FIG. 8 is a time chart showing angular speed patterns according to the present embodiment and a comparison example. The dashed line shown in FIG. 8 indicates the instruction angular speed that is equivalent to the angular speed pattern generated at S21 shown in FIG. 10. As shown in FIG. 8, a dashed dotted line indicates the angular speed pattern that is the angular speed achieved when the instruction value θa calculated at S22 based on the angular speed pattern that is generated is transmitted to the servo mechanism 53 in the comparison example. Further, as shown in FIG. 8, a solid line indicates the angular speed pattern that is the angular speed achieved when the vibration suppressing control of the present embodiment is executed as shown in FIG. 10.

As shown in FIG. 8, when the second shaft 22 starts to be accelerated from a stopping state, a timing that the angular speed starts to be increased in the present embodiment is earlier than that in the comparison example. In the stopping state, the second shaft 22 is completely stopped. Thus, according to the present embodiment, the position of the gravity center of the total load WA which is projected on the horizontal track H can be controlled to match the latest target position of the support portion 22a of the second shaft 22. In this case, since the correction target position Pb(x, y) is processed by the low-pass filter at S28 shown in FIG. 10, a sharp change of the correction target position Pb(x, y) is suppressed. The correction processing unit 52 calculates the correction instruction value θb based on the correction target position Pb(x, y) after the correction target position Pb(x, y) is filtered at S28. When the driving units 31 and 32 are controlled based on the correction instruction value θb, it is suppressed that the angular speeds of the shafts 21 and 22 sharply change.

When the second shaft 22 is controlled from an accelerating state to a constant state, a timing that the angular speed starts to be constant in the present embodiment is slower than that in the comparison example. In the accelerating state, the second shaft 22 is accelerated. In the constant state, the second shaft 22 is controlled to move at a constant speed. Thus, according to the present embodiment, since the acceleration speed is decreased when the elastic deformation of the support portion 22a of the second shaft 22 is returned to the initial shape of the support portion 22a, the position of the gravity center of the total load WA which is projected on the horizontal track can be controlled to match the latest target position of the support portion 22a. When the driving units 31 and 32 are controlled based on the correction target position Pb(x, y) after the correction target position Pb(x, y) is processed by the low-pass filter, it can be suppressed that the angular speeds of the shafts 21 and 22 sharply change.

When the second shaft 22 is controlled from the constant state to a decelerating state, a timing that the angular speed starts to be decreased in the present embodiment is earlier than that in the comparison example. In the decelerating state, the second shaft 22 is decelerated. Thus, according to the present embodiment, the position of the gravity center of the total load WA which is projected on the horizontal track can be controlled to match the latest target position of the support portion 22a. When the driving units 31 and 32 are controlled based on the correction target position Pb(x, y) after the correction target position Pb(x, y) is processed by the low-pass filter, it can be suppressed that the angular speeds of the shafts 21 and 22 sharply change.

When the second shaft 22 is controlled from the decelerating state to a movement terminating state, a timing that the angular speed starts to be decreased in the present embodiment is slower than that in the comparison example. In the movement terminating state, the second shaft 22 is controlled to gradually become static. Thus, according to the present embodiment, since a decelerating speed is decreased when the elastic deformation of the support portion 22a of the second shaft 22 is returned to the initial shape of the support portion 22a, the position of the gravity center of the total load WA which is projected on the horizontal track can be controlled to match the latest target position of the support portion 22a. When the driving units 31 and 32 are controlled based on the correction target position Pb(x, y) after the correction target position Pb(x, y) is processed by the low-pass filter, it can be suppressed that the angular speeds of the shafts 21 and 22 sharply change.

FIG. 9 is a time chart showing displacements between target stopping positions and projecting positions of gravity centers in the present embodiment and in a comparison example, respectively. In this case, the projecting position of the gravity center is the position of the gravity center of the total load which is projected on the horizontal track, and is also referred to as a gravity position. The comparison example shown in FIG. 9 is equivalent to the comparison example shown in FIG. 8.

As shown in FIG. 9, in the comparison example indicated by a dashed dotted line, the displacement between the target stopping position and the projecting position of the gravity center alternates between positive values and negative values which are relatively large. In other words, the third shaft 23 vibrates at a supporting point that is the support portion 22a of the second shaft 22, in a moving direction of the support portion 22a of the second shaft 22. In contrast, according to the present embodiment indicated by a solid line, the displacement between the target stopping position and the projecting position of the gravity center is a value close to zero. Thus, the vibration of the third shaft 23 generated at the supporting point that is the support portion 22a of the second shaft 22 is effectively suppressed.

The present embodiment can achieve following effects.

Since the third shaft 23 is slidably supported in the vertical direction, the gravity center distance L3 changes according to the operation state of the third shaft 23, and the height of the inertial force that is applied changes. In this case, the gravity-center distance calculating unit that is equivalent to the processing at S25 calculates the gravity center distance L3 based on the gravity center of the total load WA and the position of the third shaft 23 in the vertical direction. The correction target-position calculating unit that is equivalent to the processings in S26 and S27 calculates the correction target position Pb by correcting the target position Pa, based on the target position Pa, the spring constant K, the mass of the total load WA, the accelerating speed a of when the target position Pa changes, and the gravity center distance L3, such that the position of the gravity center of the total load WA which is projected on the predetermined track approaches the latest target position. According to the present disclosure, the predetermined track is equivalent to the horizontal track H. The correction instruction-value calculating unit that is equivalent to the processing in S29 calculates the correction instruction value θb driving the driving units 31 and 32, such that the support portion 22a of the second shaft 22 is moved to the correction target position Pb calculated by the correction target-position calculating unit. The servo mechanism 53 controls the driving units 31 and 32 based on the correction instruction value θb that is calculated. Thus, when the displacement between the gravity position and the target position is cancelled, it can be suppressed that the vibration is generated at the third shaft 23. Further, the correction target position Pb and the correction instruction value θb can be calculated based on the target position Pa, a known value that is the spring constant K, the accelerating speed a of the target position Pa and the gravity center distance L3 without arranging an acceleration speed sensor at a position where the vibration is actually generated. Thus, the control device can be readily actually applied to the robot 10.

According to the above description, the robot includes the driving unit, the moving unit and the predetermined shaft. The moving unit is driven by the driving unit and is slidable along the predetermined track in a horizontal surface. The predetermined shaft is slidably supported by the moving unit in a vertical direction, and a subject is assembled to the predetermined shaft.

The target position calculating unit calculates the latest target position of the moving unit. The accelerating-speed calculating unit calculates the accelerating speed of when the target position calculated by the target position calculating unit changes.

When the moving unit is accelerated or decelerated, the inertial force that is as same as an inertial force of when the mass of the total load exists is applied to a position of the gravity center distance defined from the support portion of the moving unit supporting the predetermined shaft to the gravity center of the total load of the predetermined shaft and the subject. In this case, since the predetermined shaft is slidably supported in the vertical direction, the gravity center distance changes according to an operation state of the predetermined shaft, and a height of the inertial force that is applied changes. The gravity-center distance calculating unit calculates the gravity center distance based on the gravity center of the total load and the position of the predetermined shaft in the vertical direction.

The position of the gravity center of the total load which is projected on the predetermined track displaces from the target position by the inertial force according to the spring constant of the support portion relative to the twisting of the predetermined shaft. When the position of the gravity center which is projected on the predetermined track is different from the target position, a vibration is generated at the predetermined shaft in a case where the displacement is cancelled. The inertial force can be calculated based on the mass of the total load and the accelerating speed of the target position. Further, a quantity that the position of the gravity center which is projected on the predetermined track displaces from the target position can be calculated based on the inertial force, the gravity center distance and the spring constant.

Thus, the correction target-position calculating unit calculates the correction target position by correcting the target position based on the target position, the spring constant, the mass of the total load, the accelerating speed of when the target position changes and the gravity center distance, such that the position of the gravity center which is projected on the predetermined track approaches the target position. In other words, the correction target-position calculating unit calculates the correction target position by correcting the target position so as to decrease the displacement between the position of the gravity center and the target position.

The correction instruction-value calculating unit calculates the correction instruction value driving the driving portion to move the moving unit to the correction target position calculated by the correction target-position calculating unit. The driving control unit controls the driving unit based on the correction instruction value that is calculated. Thus, when the displacement between the position of the gravity center and the target position is cancelled, it can be suppressed that the vibration is generated at the predetermined shaft. Further, the correction target position can be calculated based on the target position, a known value that is the spring constant, the accelerating speed of the target position and the gravity center distance without arranging an acceleration sensor at a position where the vibration is actually generated, and the correction instruction value can be calculated based on the correction target position. Thus, the control device can be readily actually applied to the robot.

When the support portion 22a of the second shaft 22 is accelerated, the inertial force is applied to the total load WA of the third shaft 23 and the subject W in a direction opposing the moving direction of the support portion 22a of the second shaft 22. Thus, the gravity center of the total load WA which is projected on the predetermined track moves in delay relative to the support portion 22a of the second shaft 22. When the support portion 22a of the second shaft 22 is in the accelerating state, the correction target-position calculating unit calculates the correction target position Pb such that the support portion 22a of the second shaft 22 is controlled to be in advance of the target position. Thus, the correction target-position calculating unit can calculate the correction target position Pb to decrease the displacement between the position of the gravity center which is projected on the predetermined track and the target position.

When the support portion 22a of the second shaft 22 is decelerated, the inertial force is applied to the total load WA of the third shaft 23 and the subject W in a direction along the moving direction of the support portion 22a of the second shaft 22. Thus, the gravity center of the total load WA which is projected on the predetermined track moves in advance relative to the support portion 22a of the second shaft 22. When the support portion 22a of the second shaft 22 is in the decelerating state, the correction target-position calculating unit calculates the correction target position Pb such that the support portion 22a of the second shaft 22 is controlled to be in delay of the target position. Thus, the correction target-position calculating unit can calculate the correction target position Pb to decrease the displacement between the position of the gravity center which is projected on the predetermined track and the target position.

The correction target-position calculating unit calculates the correction target position Pb such that the position of the gravity center which is projected on the predetermined track matches the target position. Thus, the displacement between the position of the gravity center which is projected on the predetermined track and the target position can be minimized, and it can be further suppressed that the vibration is generated at the third shaft 23.

When the correction instruction value θb sharply changes, a torque greater than an upper limit torque that can be generated by the driving units 31 and 32 that are controlled based on correction instruction values θb may be requested at the driving units 31 and 32. The correction target-position calculating unit changes the correction target position Pb to a target position obtained by filtering the correction target position Pb that is calculated. Thus, it can be suppressed that the correction instruction value θb driving the driving units 31 and 32 such that the support portion 22a of the second shaft 22 is moved to the correction target position Pb sharply changes. The servo mechanism 53 controls the driving units 31 and 32 based on the correction instruction value θb calculated by the correction instruction-value calculating unit. Thus, it can be suppressed that the torque greater than the upper limit torque is requested at the driving units 31 and 32.

The correction target-position calculating unit can calculate the correction target portion Pb by adding the correction quantity ΔP calculated by a formula that $\Delta P = M \times a \times L^2/K$ to the target position Pa. Thus, the correction target position Pb and the correction instruction value θb can be readily calculated, and the control device can be readily actually applied to the robot 10.

The robot 10 is the horizontal multi-joint robot 10 including the first shaft 21 that rotates in a horizontal surface, the second shaft 22 that is rotatably supported by the first shaft 21 in a horizontal surface, and the third shaft 23 that is movable relative to the tip end portion of the second shaft 22 in the vertical direction. Thus, in the horizontal multi-joint robot 10, the vibration of the third shaft 23 can be suppressed.

The above embodiments can be modified as followings.

According to the first embodiment, in the flowchart shown in FIG. 7, the processing at S17 where the correction instruction value θb is processed by the low-pass filter can be cancelled.

According to the first embodiment, the correction instruction-value calculating unit calculates the correction instruction value θb such that the position of the gravity center of the total load WA which is projected on the predetermined track matches the target position. However, the correction instruction-value calculating unit can calculate the correction instruction value θb such that the position of the gravity center matches an intermediate position between the position of the gravity center and the target position. In this case, since the correction instruction value θb is calculated by correcting the instruction value θa such that the position of the gravity center approaches the target position, it can be suppressed that the vibration is generated at the third shaft 23.

According to the second embodiment, in the flowchart shown in FIG. 10, the processing at S28 where the correction target position Pb is processed by the low-pass filter can be cancelled. In this case, the correction instruction value θb calculated at S29 may be processed by a low-pass filter. Alternatively, a processing where the correction instruction value θb is processed by the low-pass filter can be cancelled.

According to the second embodiment, a control of the robot 10 is not limited to a point to point (PTP) control. The control can include a continuous path (CP) control. In this case, the latest target position Pa(x, y) used in the CP control can be used in the processing at S23 shown in FIG. 10, without calculating the latest target position Pa(x, y) from the instruction values θa of all of the shafts.

Figure 11:
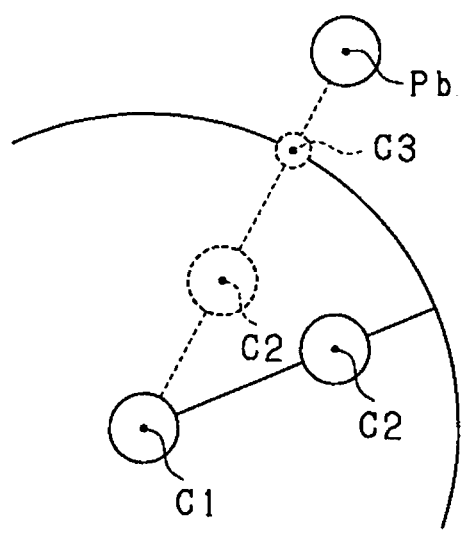
FIG. 11 is a schematic diagram showing an embodiment where a correction target position is changed to a position in a movable range.

According to the second embodiment, as shown in FIG. 11, when the correction target position Pb calculated by the correction target-position calculating unit is out of a movable range of the third shaft line C3 that is the equivalent to a movable range of the support portion 22a of the third shaft 23, the correction instruction value θb that drives the driving units 31, 32 such that the support portion 22a is moved to the correction target position Pb cannot be calculated. In this case, it is possible that an error is generated in the control of the robot 10 and the robot 10 is stopped. When the correction target position Pb is out of the movable range of the support portion 22a, the correction target-position calculating unit changes the correction target position Pb to a position in the movable range that is closest to the correction target position Pb. In other words, as shown in FIG. 11, the correction target-position calculating unit changes the correction target position Pb to a position of the third shaft line C3. Thus, the vibration of the third shaft 23 can be suppressed in a range where the control of the robot 10 can be continued.

According to the second embodiment, the correction target-position calculating unit calculates the correction target position Pb such that the position of the gravity center of the total load WA of the third shaft 23 and the subject W which is projected on the predetermined track matches the target position. However, the correction target-position calculating unit can calculate the correction target position Pb such that the position of the gravity center matches an intermediate position between the position of the gravity center and the target position. In this case, since the correction target position Pb is calculated by correcting the target position Pa such that the position of the gravity center approaches the target position, it can be suppressed that the vibration is generated at the third shaft 23.

According to the present disclosure, the subject W may not be assembled to the tip end of the third shaft 23. That is, the subject W may be cancelled. In this case, the third shaft 23 is equivalent to the total load WA.

According to the present disclosure, the vibration suppressing control can be also applied to an XR robot including a first moving unit that is slidable relative to a first track that is predetermined along an X-direction rail in a horizontal surface and a second moving unit that is movably supported by the first moving unit and is slidable relative to a second track that is an arc track and is predetermined around the first moving unit as a center in a horizontal surface. In this case, the vibration suppressing control may be executed with respect to the first moving unit, by replacing an angular speed with a speed and replacing an angular position with a position.

Alternatively, the vibration suppressing control can be applied to an XY robot including a first moving unit that is slidable relative to a first track that is predetermined along an X-direction rail in a horizontal surface and a second moving unit that is movably supported by the first moving unit and is slidable relative to a second track that is predetermined along a Y-direction rail in a horizontal surface. In this case, the vibration suppressing control may be executed with respect to the first moving unit and/or the second moving unit, by replacing an angular speed with a speed and replacing an angular position with a position.

Alternatively, the vibration suppressing control can be applied to a robot including the second moving unit and the third shaft 23 without the first moving unit.

While the present disclosure has been described with reference to embodiments thereof, it is to be understood that the disclosure is not limited to the embodiments and constructions. The present disclosure is intended to cover various modification and equivalent arrangements. In addition, while the various combinations and configurations, other combinations and configurations, including more, less or only a single element, are also within the spirit and scope of the present disclosure.

What is claimed is:

1. A control device for a robot including a driving unit, a moving unit that is driven by the driving unit and is slidable along a predetermined track in a horizontal surface, and a predetermined shaft that is slidably supported by the moving unit in a vertical direction, the predetermined shaft to which a subject is assembled, comprising:
   an instruction value calculating unit calculating an instruction value that drives the driving unit such that the moving unit is moved to a target position that is a latest target position of the moving unit;
   an accelerating-speed calculating unit calculating an accelerating speed of when the instruction value calculated by the instruction value calculating unit changes;
   a gravity-center distance calculating unit calculating a gravity center distance that is a distance from a support portion of the moving unit supporting the predetermined shaft to a gravity center of a total load that is equivalent to the predetermined shaft and the subject, based on the gravity center and a position of the predetermined shaft in the vertical direction;
   a correction instruction-value calculating unit calculating a correction instruction value by correcting the instruction value calculated by the instruction value calculating unit, based on the instruction value, a spring constant of the support portion relative to a twisting of the predetermined shaft, a mass of the total load, the accelerating speed calculated by the accelerating-speed calculating unit and the gravity center distance calculated by the gravity-center distance calculating unit, such that a position of the gravity center which is projected on the predetermined track approaches the target position; and
   a driving control unit controlling the driving unit based on the correction instruction value calculated by the correction-instruction valve calculating unit.

2. The control device for the robot according to claim 1, wherein
   when the moving unit is in an accelerating state, the correction instruction-value calculating unit calculates the correction instruction value such that the moving unit is in advance of the target position.

3. The control device for the robot according to claim 1, wherein
   when the moving unit is in a decelerating state, the correction instruction-value calculating unit calculates the correction instruction value such that the moving unit is in delay of the target position.

4. The control device for the robot according to claim 1, wherein
   the correction instruction-value calculating unit calculates the correction instruction value such that the position of the gravity center matches the target position.

5. The control device for the robot according to claim 1, wherein
   the correction instruction-value calculating unit calculates the correction instruction value such that the position of the gravity center matches an intermediate position between the position of the gravity center and the target position.

6. The control device for the robot according to claim 1, wherein
   the correction instruction-value calculating unit changes the correction instruction value that is calculated to an instruction value obtained by filtering the correction instruction value.

7. The control device for the robot according to claim 1, wherein
   the moving unit is slidable along an arc track that is predetermined around a center axis that is predetermined as a center, in a horizontal surface,
   the spring constant is expressed as K, the mass of the total load is expressed as M, a target angular position of the moving unit relative to the center axis as a center, which corresponds to the target position, is expressed as $\theta$, an angular accelerating speed of when the target angular position $\theta$ changes is expressed to as $a\omega$, the gravity center distance is expressed as L, and a correction quantity of the target angular position $\theta$ is expressed as $\Delta\theta$,
   the instruction value calculating unit calculates the target angular position $\theta$ as the instruction value, and
   the correction instruction-value calculating unit calculates the correction instruction value by adding the correction quantity $\Delta\theta$ calculated by using a formula that $\Delta\theta = M \times a\omega \times L^2/K$ to the target angular position $\theta$.

8. The control device for the robot according to claim 7, wherein
   the robot includes the moving unit including a first moving unit that is slidable relative to a first arc track that is predetermined around a center axis that is predetermined as a center in a horizontal surface and a second moving unit,
   the second moving unit is movably supported by the first moving unit, the second moving unit is slidable relative to a second arc track that is predetermined and is included in the arc track around the first moving unit as a center in a horizontal surface, the arc track is equivalent to the predetermined track, and
   the instruction value calculating unit, the accelerating-speed calculating unit, the gravity-center distance calculating unit, the correction instruction-value calculating unit and the driving control unit execute processings relative to the first moving unit and the second moving unit.

9. A control device for a robot including a driving unit, a moving unit that is driven by the driving unit and is slidable along a predetermined track in a horizontal surface, and a predetermined shaft that is slidably supported by the moving unit in a vertical direction, the predetermined shaft to which a subject is assembled, comprising:
- a target position calculating unit calculating a target position that is a latest target position of the moving unit;
- an accelerating-speed calculating unit calculating an accelerating speed of when the target position calculated by the target position calculating unit changes;
- a gravity-center distance calculating unit calculating a gravity center distance that is a distance from a support portion of the moving unit supporting the predetermined shaft to a gravity center of a total load that is equivalent to the predetermined shaft and the subject, based on the gravity center and a position of the predetermined shaft in the vertical direction;
- a correction target-position calculating unit calculating a correction target position that is obtained by correcting the target position, based on the target position calculated by the target position calculating unit, a spring constant relative to a twisting of the predetermined shaft, a mass of the total load, the accelerating speed calculated by the accelerating-speed calculating unit, and the gravity center distance calculated by the gravity-center distance calculating unit, such that a position of the gravity center which is projected on the predetermined track approaches the target position;
- a correction instruction-value calculating unit calculating a correction instruction value that drives the driving unit to control the driving unit to move to the correction target position calculated by the correction target-position calculating unit; and
- a driving control unit controlling the driving unit based on the correction instruction value calculated by the correction-instruction valve calculating unit.

10. The control device for the robot according to claim 9, wherein
when the moving unit is in an accelerating state, the correction target-position calculating unit calculates the correction target position such that the moving unit is in advance of the target position.

11. The control device for the robot according to claim 9, wherein
when the moving unit is in a decelerating state, the correction target-position calculating unit calculates the correction target position such that the moving unit is in delay of the target position.

12. The control device for the robot according to claim 9, wherein
the correction target-position calculating unit calculates the correction target position such that the position of the gravity center matches the target position.

13. The control device for the robot according to claim 9, wherein
the correction target-position calculating unit calculates the correction target position such that the position of the gravity center matches an intermediate position between the position of the gravity center and the target position.

14. The control device for the robot according to claim 9, wherein
the correction target-position calculating unit changes the correction target position to a target position obtained by filtering the correction target position that is calculated.

15. The control device for the robot according to claim 9, wherein
the correction instruction-value calculating unit changes the correction instruction value to an instruction value obtained by filtering the correction instruction value that is calculated.

16. The control device for the robot according to claim 9, wherein
the spring constant is expressed as K, the mass of the total load is expressed as M, the target position is expressed as P, the accelerating speed of when the target position P changes is expressed as a, the gravity center distance is expressed as L, and a correction quantity of the target position P is expressed as $\Delta P$,
the correction target-position calculating unit calculates the correction target position by adding the correction quantity $\Delta P$ calculated by using a formula that $\Delta P = M \times a \times L^2 / K$ to the target position P.

17. The control device for the robot according to claim 9, wherein
the robot includes the moving unit including a first moving unit that is driven by a first driving unit of the driving unit and is slidable along a first track that is predetermined in a horizontal surface and a second moving unit that is driven by a second driving unit of the driving unit,
the second moving unit is movably supported by the first moving unit, and is slidable along a second track that is predetermined as the predetermined track in a horizontal surface relative to the first moving unit,
the target position calculating unit calculates the latest target position of the second moving unit that is the target position,
the correction instruction-value calculating unit calculates a first correction instruction value and a second correction instruction value that drive the first driving unit and the second driving unit, respectively, such that the second moving unit is moved to the correction target position calculated by the correction target-position calculating unit, and
the driving control unit controls the first driving unit and the second driving based on the first correction instruction value and the second correction instruction value that are calculated by the correction instruction-value calculating unit, respectively.

18. The control device for the robot according to claim 17, wherein
the first moving unit is slidable along a first arc track that is predetermined as the first track around a center axis that is predetermined as a center, in a horizontal surface, and
the second moving unit is slidable along a second arc track that is predetermined as the second track around the first moving unit as a center, in a horizontal surface.

19. The control device for the robot according to claim 9, wherein
when the correction target position that is calculated is out of a movable range of the moving unit, the correction target-position calculating unit changes the correction target position to a position in the movable range that is closest to the correction target position.

20. A control device for a robot including a driving unit, a moving unit that is driven by the driving unit and is slidable along a predetermined track in a horizontal surface, and a predetermined shaft that is slidably supported by the moving unit in a vertical direction, the predetermined shaft to which a subject is assembled, comprising:
- an instruction value calculating unit calculating an instruction value that drives the driving unit such that the moving unit is moved to a target position that is a latest target position of the moving unit;
- an accelerating-speed calculating unit calculating an angular accelerating speed of when the instruction value calculated by the instruction value calculating unit changes;
- a gravity-center distance calculating unit calculating a gravity center distance that is a distance from a support portion of the moving unit supporting the predetermined shaft to a gravity center of a total load that is equivalent to the predetermined shaft and the subject, based on the gravity center and a position of the predetermined shaft in the vertical direction;
- a correction instruction-value calculating unit calculating a correction instruction value by correcting the instruction value calculated by the instruction value calculating unit, based on the instruction value, a spring constant of the support portion relative to a twisting of the predetermined shaft, a mass of the total load, the angular accelerating speed calculated by the accelerating-speed calculating unit and the gravity center distance calculated by the gravity-center distance calculating unit, such that a position of the gravity center which is projected on the predetermined track approaches the target position; and
- a driving control unit controlling the driving unit based on the correction instruction value calculated by the correction-instruction valve calculating unit.

21. The control device for the robot according to claim 20, wherein
the moving unit is slidable along an arc track that is predetermined around a center axis that is predetermined as a center, in a horizontal surface,
the spring constant is expressed as K, the mass of the total load is expressed as M, a target angular position of the moving unit relative to the center axis as a center, which corresponds to the target position, is expressed as $\theta$, the angular accelerating speed of when the target angular position $\theta$ changes is expressed to as $a\omega$, the gravity center distance is expressed as L, and a correction quantity of the target angular position $\theta$ is expressed as $\Delta\theta$,
the instruction value calculating unit calculates the target angular position $\theta$ as the instruction value, and
the correction instruction-value calculating unit calculates the correction instruction value by adding the correction quantity $\Delta\theta$ calculated by using a formula that $\Delta\theta = M \times a\omega \times L^2/K$ to the target angular position $\theta$.

* * * * *

UNITED STATES PATENT AND TRADEMARK OFFICE
CERTIFICATE OF CORRECTION

Page 1 of 1

PATENT NO. : 10,350,754 B2
APPLICATION NO. : 15/662724
DATED : July 16, 2019
INVENTOR(S) : Kenji Nagamatsu It is certified that error appears in the above-identified patent and that said Letters Patent is hereby corrected as shown below:

On the Title Page

(30) Foreign Application Priority Data
Please change Column 1, Line 15 "(CN)" to --(JP)--
Please change Column 1, Line 16 "(CN)" to --(JP)--

Signed and Sealed this
Eighth Day of October, 2019

Andrei Iancu
*Director of the United States Patent and Trademark Office*